United States Patent [19]
Nakkiran et al.

[11] Patent Number: 6,134,567
[45] Date of Patent: Oct. 17, 2000

[54] HIGH RESOLUTION ALPHANUMERIC CHARACTER GENERATION

[75] Inventors: Raj Nakkiran, Vancouver; Donald J. Clark, Camas; Erik D Ness, Vancouver, all of Wash.

[73] Assignee: Hewlett-Packard Company, Palo Alto, Calif.

[21] Appl. No.: 09/090,245

[22] Filed: Jun. 3, 1998

[51] Int. Cl.[7] .............................. G01D 9/42; G06K 15/00
[52] U.S. Cl. ........................ 707/526; 707/527; 707/531; 345/467; 345/468; 345/469; 345/470; 345/471; 345/472
[58] Field of Search ..................................... 707/526, 527, 707/531; 345/467, 468, 469, 470, 471, 472; 358/1.1, 1.2, 1.9, 1.11, 1.13

[56] References Cited

U.S. PATENT DOCUMENTS

| | | | |
|---|---|---|---|
| 4,159,882 | 7/1979 | Sanders, Jr. et al. | 400/555 |
| 4,649,435 | 3/1987 | Kramer | 358/426 |
| 5,025,396 | 6/1991 | Parks et al. | 707/506 |
| 5,045,869 | 9/1991 | Isaka et al. | 347/254 |
| 5,506,940 | 4/1996 | Bamford et al. | 358/1.11 |
| 5,583,978 | 12/1996 | Wolff et al. | 358/447 |
| 5,768,487 | 6/1998 | LeClair et al. | 358/1.17 |
| 5,822,510 | 10/1998 | LeClair et al. | 358/1.16 |
| 5,963,216 | 10/1999 | Chiarabini et al. | 345/439 |
| 6,005,588 | 12/1999 | Guha | 345/467 |

OTHER PUBLICATIONS

Computer Graphics: Priciples and Practice by Foley et al.—Published by Addison–Wesley pp. 210–213, 1990.
Wyszecki & Stiles; Color Science: Concepts and Methods, Quantitative Data and Formulae; Second Edition; pp. cover, copr. notice, 119–130 1982.

*Primary Examiner*—Stephen S. Hong
*Assistant Examiner*—Wasseem H. Hamdan

[57] ABSTRACT

A printer device driver system includes a relatively simplistic kernel mode device driver, KM_DRIVER. KM_DRIVER supplies limited functionality for basic Device Driver Interface, DDI, operations compatible with O/S kernel mode components. Separate reporting of graphics objects data and text data is made. The device driver is now divided into: a kernel mode analysis segment KM_TEXT and a user mode text resolution generator UM_TEXT segment. A user mode driver, UM_DRIVER, is provided for receiving DDI coded instructions. In essence, UM_TEXT subroutine ignores reported resolution and renders text in any resolution up to and including the highest possible resolution for the printer apparatus provided. A set of text data output from the application and O/S is reported to KM_DRIVER in a fixed resolution. Text data is received with DDI text print requests. When a font is not recreatable, rendering is performed at the fixed resolution and output to the printer. When a font is recreatable, and the printer is capable of a rendering resolution greater than the reported resolution, the USER_MODE is used to obtain a higher resolution rendering. DDI parameters are forwarded to UM_TEXT subroutine. A memory construct is established. Next, a render resolution font is simulated by reverse mapping DDI parameters into a form suited to enhancement. Using the simulated font, a transformation from reported resolution to the higher density render resolution is applied. Render resolution formatted text is sent to the memory construct is substituted for reported resolution text and output to the printer.

11 Claims, 8 Drawing Sheets

HIGH RESOLUTION ALPHANUMERIC CHARACTER GENERATION

BACKGROUND OF THE INVENTION

1. Field of the Invention

The present invention relates generally to printer printing processes, more particularly to generating high resolution alphanumeric characters, and more specifically to a method for generating high resolution text in printer drivers irrespective of operating system kernal mode Device Drive Interface ("DDI"), commands for text resolution.

2. Description of Related Art

Computer application programs are written and provided to the end-user for the solution of specific problems or to perform specific actions. Many applications programs are capable of producing hard copy printout commands. As examples, there are word processing software for producing documents, software programs for specific reports such as spreadsheets for accounting, software applications for updating specific files or databases, and the like.

Figure 1:
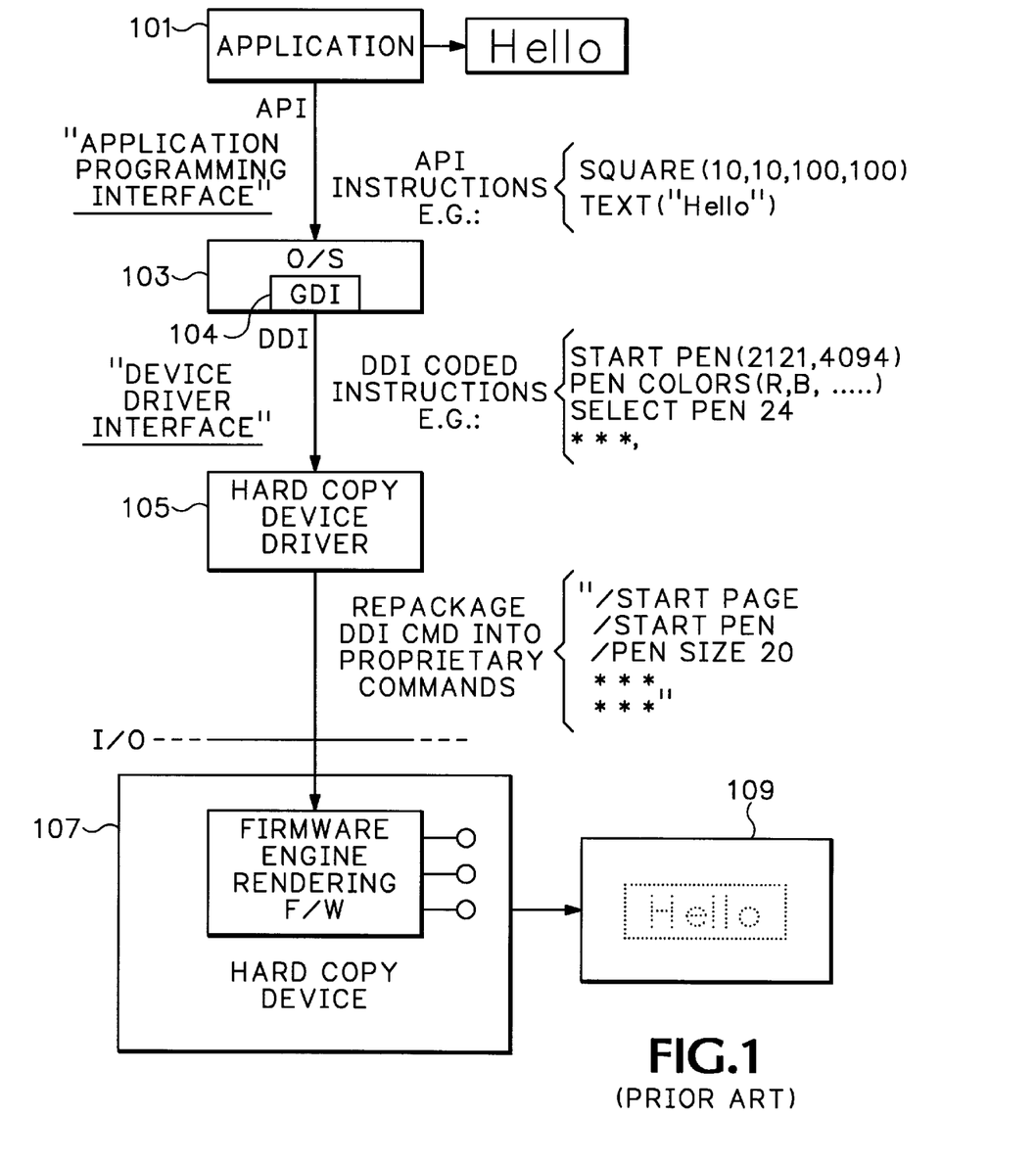
FIG. 1 (Prior Art) is a schematic block diagram depicting a conventional system for generating alphanumeric characters using a computer and hard copy peripheral.

FIG. 1 (Prior Art) shows a typical example of a common scheme for generating alphanumeric text. Application programs 101 generally provide very simple, generic-type, instructions for generating text over the Application Programming Interface, or "API". For example, if a word in a box is desired from a word processing program, the API instruction simply provides instructions such as:

"SQUARE($n_1$, $n_2$, $n_3$, $n_4$)

TEXT('word')".

In turn, API codes are defined and provided by a developer of computer operating systems programs, or "O/S," 103 to the application program developers as essential entry points into the operating system software. The O/S is a set of master programs and routines resident in a computer which guides the computer in the performance of its tasks, and assists the applications programs with certain, predefined support functions; exemplary state of the art operating systems are DOS, WINDOWS and WINDOWS NT™ software. Application programs are packaged, for example, as a "DOS Version" or a "Windows Version," indicating which O/S compatibility is provided. In the generation of text, the O/S takes API instructions and generates elaborate code instructions for a device driver interface, or "DDI" (where there may be hundreds of DDI code instructions for each API instruction). For example, in a Windows O/S, Microsoft has supplied a graphical device interface, or "GDI," component 104. The GDI 104 routines are the video screen manager program for any personal computer using the Windows O/S; GDI knows how to draw almost anything and brokers the commands between the application 101 and a hard copy device driver code 105. The DDI provides entry points into the driver code 105 used by the O/S provider. A hard copy apparatus supplier's driver code 105 essentially repackages DDI code instructions into a specific format— e.g., PostScript™ fontware commands—which are then used to actually print each character. Hard copy apparatus manufacturers provide specific apparatus driver code 105, generally proprietary or conforming to an industry standard, for translating the DDI instructions into a form which will give the proper output from the writing instrument—e.g., an ink-jet pen—by the printing apparatus' 107 rendering firmware. The rendering firmware converts the specific format instructions to simple, digital PRINT/NO PRINT dot matrix commands and the dots are printed accordingly on a print medium 109 at a rendered resolution. [Note also that the O/S developer may also suggest "Normal Printer Driver " commands and modes as part of the O/S kernel operations which the driver code developer can implement to ensure compatibility between the driver code and the O/S.]

In order to be compatible with any and all application program software providers, an O/S has substantially rigid kernel programs—programs that form the most essential instructions. The kernel formatting is provided by the O/S developer to the application software developers and device driver developers to ensure compatibility. In the case of printing text, the elaborate DDI instructions are generally kernal mode components. For efficient printing and enhanced printing, however, use of kernel program instructions is not practical. In other words, as the kernel mode components are essentially an extension of the O/S, access is extremely limited and carefully controlled by the O/S. Moreover, even when allowed, customization of an O/S kernel mode component for every character capable of being printed is overly expensive in terms of real time operation and extensive memory capacity requirements. Thus, to be compatible with an O/S program such as the WindowsNT O/S, the applications provider conforms to a standard resolution—e.g., three hundred dots-per-inch by three hundred dots-per-inch (300 dpi×300 dpi)—also referred to hereinafter as the reported resolution. That is, in the WindowsNT printing model, printer drivers need to report a single, square, resolution in the beginning of a command set and all text and graphics are designed to be rendered at that conventional, fixed, reported resolution.

A problem with this convention is that the writing instruments, such as ink-jet pens manufactured by Hewlett-Packard Company, assignee herein, are capable of printing alphanumeric text characters at much higher resolution than that used as a standard by operating systems. Thus, the reporting of standard single resolution is too simplistic for an HP™ ink-jet pen that is capable of printing black text at a much higher resolution than color graphics. Moreover, with HP ink-jet pens, the resolution need not be the same in the x-axis (pen scan) and the y-axis (paper translation), which can enhance text presentation by non-square printing. However, even were the host application and O/S capable of generating reported resolution data equal to a higher resolution to match the capability of the high quality text writing instrument, the amount of data transmitted over the input-output output buffer printing path would require a much larger memory in the hard copy apparatus than is economical for the original equipment manufacturer to build in for the average end-user. Additionally, a reporting resolution greater than 300 dpi×300 dpi would slow down the time to print a single page to an unacceptably slow rate for the average desired text quality. At the same time, compared to color printing, there is a desire for improvement of print quality to a visual level that is achieved only in greater than 300 dpi×300 dpi resolution. Improving print quality without slowing throughput or increasing product costs provides contradictory design objectives for the system engineer. Therefore, there is a need to generate text in more than one resolution—namely, above the O/S kernel mode reporting structure—in order to achieve highest quality alphanumeric character rendering while still maintaining compatibility with the O/S.

One solution is to report the highest resolution supported by the printer hardware and receive both text and graphics at this very high resolution. Then, black text data is processed as is but graphics data is sub-sampled to lower the resolution to the actual supported hardware color printing capability. This technique demands high data traffic and a large memory capability to modify kernal mode instructions.

Another solution is to report the lowest resolution supported by the printer, process the color graphics as is but upscale black text data using additional text rendering software. In other words, once the inaccessible hard copy device driver routines are established, post-driver image processing of data must be employed to improve print quality. This post-drive image processing generally is either a fast but less than satisfactory simple solution, such as a doubling of received reported resolution data and printing at double the reported resolution, or the use of complex and slower image processing programs known as resolution enhancement techniques ("RET"). As the font size shrinks, e.g., in lengthy, often used, contract forms reduced to one page for ease of use, simple data doubling techniques are not useful. Alphanumeric character RET image processing programs have limited success in improving the quality of scaled text, particularly if the resolution is non-square. The RET solutions often require large memories to store look-up tables ("LUT").

Thus, there is a need for a method of generating high resolution alphanumeric characters in the highest resolution supported by the hardware without resort to customization of kernal mode instructions.

SUMMARY OF THE INVENTION

In its basic aspects, the present invention provides a computerized method for rendering text from a set of text data having a reported resolution. The method includes the steps of: receiving a set of text data having a given font structure at a reported resolution from a computer operating system; determining if the set of to text data is recreatable; and, if the set of text data is recreatable, rendering text having a higher resolution than the reported resolution by reverse mapping said set of text data into a simulated font structure, transforming the set of text data using the simulated font structure from the reported resolution to a rendering resolution greater than the reported resolution, and substituting the set of text data using the simulated font structure transformed to the rendering resolution for the set of text data having given font structure, or if the set of text data is not recreatable, rendering text at the reported resolution. If a set of text data is recreatable, the method includes separately reporting graphics data and text data, and recombining graphics data objects and text data objects using said set of text data using the simulated font structure.

In another basic aspect, the present invention provides a text data resolution enhancement computer process for recreatable font data having a reported resolution, including the steps of providing a hard copy device driver program including separate kernel mode device driver process steps and user mode device driver process steps, wherein said kernel mode device driver process steps includes process steps for outputting font data at the reported resolution in a known manner and said user mode device driver process steps includes process steps for enhancing said recreatable font data to a resolution higher than said reported resolution.

In a basic aspect, the present invention also provides a computerized method for text data and graphics data printing from operating system (O/S) standard DDI data having a reported resolution, the method including the steps of: providing a device driver program having a kernel mode device driver module and a user mode device driver module; said kernel mode device driver module including the steps of receiving a set of text data in said reported resolution with accompanying DDI text print requests, when a font is not recreatable, rendering text data at the reported resolution, and outputting the set of text data at the reported resolution, when a font is recreatable, determining if printing is capable at a rendering resolution greater than the reported resolution, when printing is capable at a rendering resolution greater than the reported resolution, transferring the set of text data and accompanying DDI text print requests to said user mode device driver module, and rendering the set of text data at said rendering resolution, outputting the set of text data at said rendering resolution.

It is an advantage of the present invention that it provides high resolution hard copy output from a lower resolution data stream.

It is an advantage of the present invention that it renders alphanumeric character text enhancement without resort to customization of kernal mode instructions.

It is an advantage of the present invention that alphanumeric character text resolution is separated from color graphics resolution, providing maximum flexibility and highest print quality regardless of application reported resolution.

It is an advantage of the present invention that it provides superior print text quality using ink-jet hard copy apparatus.

It is an advantage of the present invention that it allows high resolution text printing with different resolution in the x-axis and y-axis, enabling independent hardware advancements to be readily supported.

Other objects, features and advantages of the present invention will become apparent upon consideration of the following explanation and the accompanying drawings, in which like reference designations represent like features throughout the drawings.

BRIEF DESCRIPTION OF THE DRAWINGS

FIGS. 2A and 2B are simplified schematic block diagrams depicting an overall system in accordance with the present invention for generating alphanumeric characters using a computer and hard copy peripheral in which:

FIG. 2A shows an overall system block diagram, and

FIG. 2B shows details for components of FIG. 2A.

The drawings referred to in this specification should be understood as not being drawn to scale except if specifically noted.

DESCRIPTION OF THE PREFERRED EMBODIMENT

Reference is made now in detail to a specific embodiment of the present invention which illustrates the best mode presently contemplated by the inventors for practicing the invention. Alternative embodiments are also briefly described as applicable.

Figure 2A:
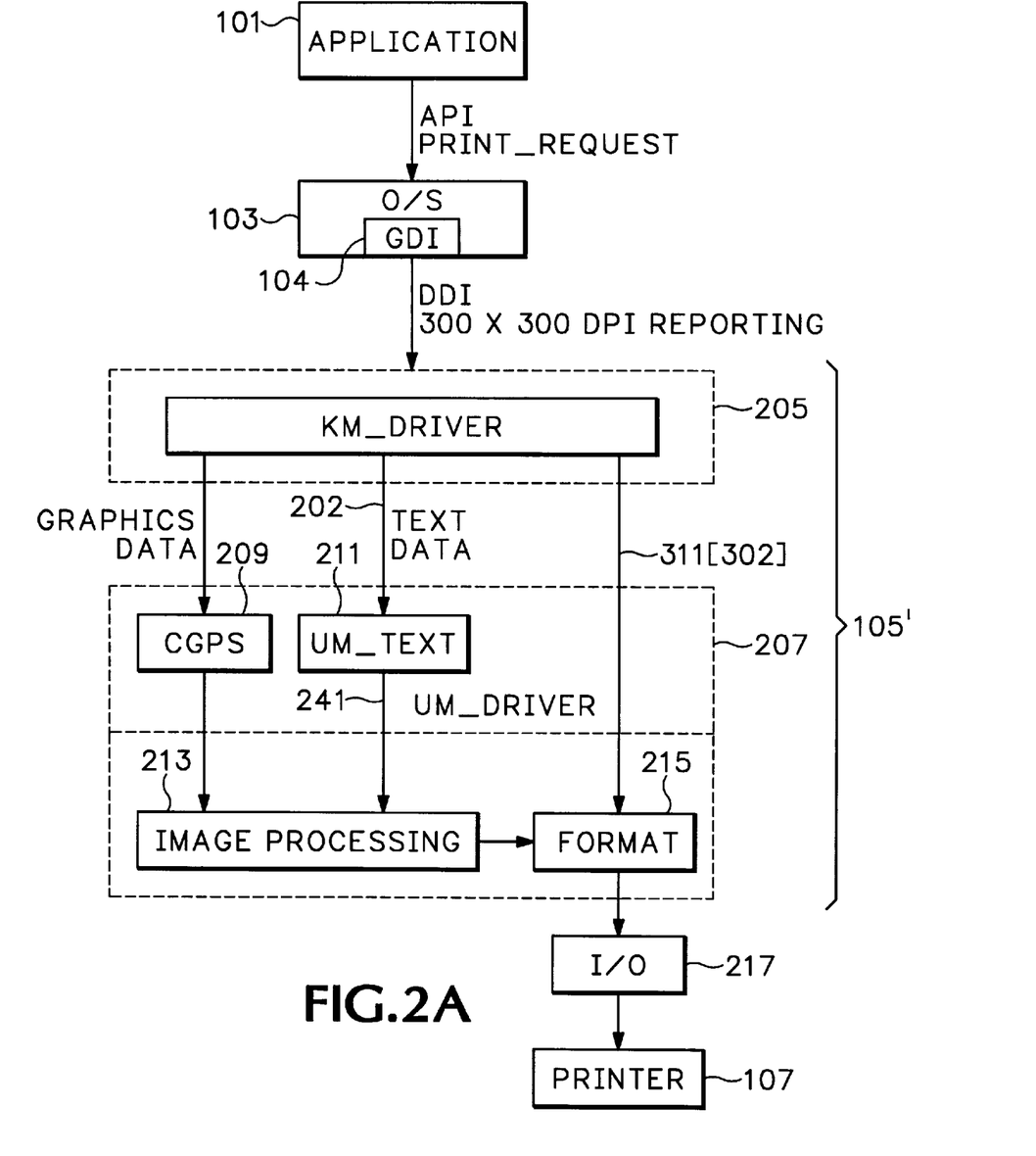

In the block diagram of FIG. 2A, the application program 101 makes an API PRINT_REQUEST to the appropriate O/S GDI 104. The DDI coded instructions are passed on to a hard copy device driver 105' in accordance with the present invention. The specialized device driver 105' includes a relatively simplistic kernel mode device driver module, KM_DRIVER, 205. The KM_DRIVER 205 supplies limited functionality for basic DDI operations compatible with O/S kernel mode components (as further described with respect to FIG. 4 hereinafter). A separate, downstream, user mode device driver module, UM_DRIVER, 207, provides the remaining functionality for processing DDI operations such that the O/S no longer has to be accessed.

Functionality relevant to the present invention is the separate reporting of graphics objects data and text data as demonstrated by the FIG. 2A arrows labeled "Graphics data" and "Text data," respectively. A separate user mode device driver module, UM_DRIVER, 207 is provided and includes a module for receiving the data and DDI coded instructions for graphics objects data in a color graphics printing system module, "CGPS," 209. Graphics objects data, but not text data, are rendered by the UM_DRIVER 207 CGPS module 209 at the reported fixed resolution per O/S DDI coded instructions (e.g., 300 dpi×300 dpi using Microsoft Windows color printing system DDI codes) by software and firmware routines as would be known in the art. Text data are processed separately by a kernel mode subroutine, "KM_TEXT," 202 (see also, FIG. 3 detail hereinafter) and a user mode text subroutine, "UM_TEXT," 211. In essence, when requested and when possible with the hard copy printing apparatus available, the UM_TEXT subroutine 211 ignores the reported resolution and renders text in any resolution up to and including the highest possible resolution for the printing hardware apparatus provided (see also, FIG. 4 detail hereinafter). Both text data and graphics objects data then pass through standard driver components such as IMAGE PROCESSING 213 routines (grey scale, print modes, enhancement routines, and the like as would be known in the art) and FORMAT 215 rendering routines into digital pixel PRINT/NO PRINT signals which are buffered, "I/O", 217 to the hard copy device 107.

Figure 2B:
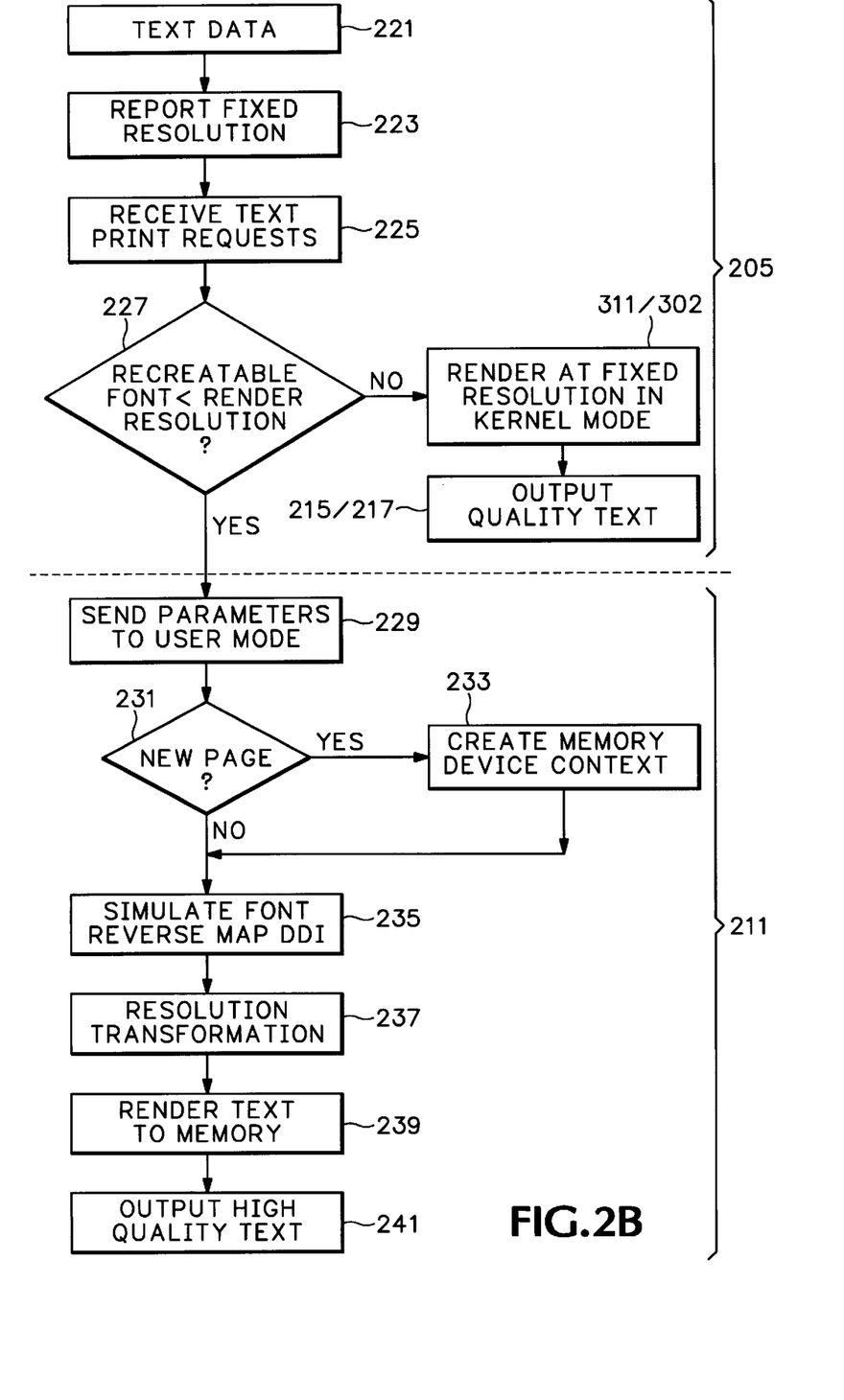

FIG. 2B shows a simplified flow chart for the system of FIG. 2A for the kernel mode device driver components, KM_DRIVER 205, and the user mode device driver UM_DRIVER 207 user mode high resolution text generator module, UM_TEXT, 211, of the process in accordance with the present invention. As per known data processing techniques, a set of text data 221 output from the application 101 (FIGS. 1 and 2B) and the O/S 103 is reported 223 to the KM_DRIVER in a fixed resolution. The text data is received 225 with DDI text print requests. When a font is not recreatable 227, NO-path (e.g., for text data using an embedded font such as an Adobe™ Acrobat™ application generated document), rendering is performed at the fixed resolution 311/302 and output 215/217 to the printer 107. When a font is recreatable 227, YES-path, and the printer 107 is capable of a rendering resolution greater than the reported resolution 223, the UM_DRIVER 207 uses the user mode high resolution text generator subroutine, UM_TEXT 211, to obtain a higher resolution text rendering than the reported resolution data would provide. The DDI parameters are forwarded 229 to the UM_TEXT subroutine 211. Upon receipt of data for the first page of text 231, YES-path, a virtual page memory construct 233 is established. Next, a render resolution font is simulated 235 by reverse mapping the DDI parameters into a form suited to enhancement (see FIG. 4 details hereinafter). Using the simulated font 235, a transformation (see FIGS. 4 and 5 details hereinafter) from reported resolution to the higher density render resolution is applied 237 to the text data. The render resolution formatted text produced by the transform 237 is sent 239 to the memory construct 233. The render resolution formatted text is substituted 241 for the reported resolution 223 text 221 and output 241 to the printer 107. Note again from FIG. 2A that downstream image processing 213 and formatting 215 can be applied to the higher density render resolution text output 241.

Generically, then the invention hard copy device driver is now divided into two segments: a kernel mode analysis segment subroutine KM_TEXT 202 and a user mode text resolution generator UM_TEXT segment subroutine 211.

Figure 3:
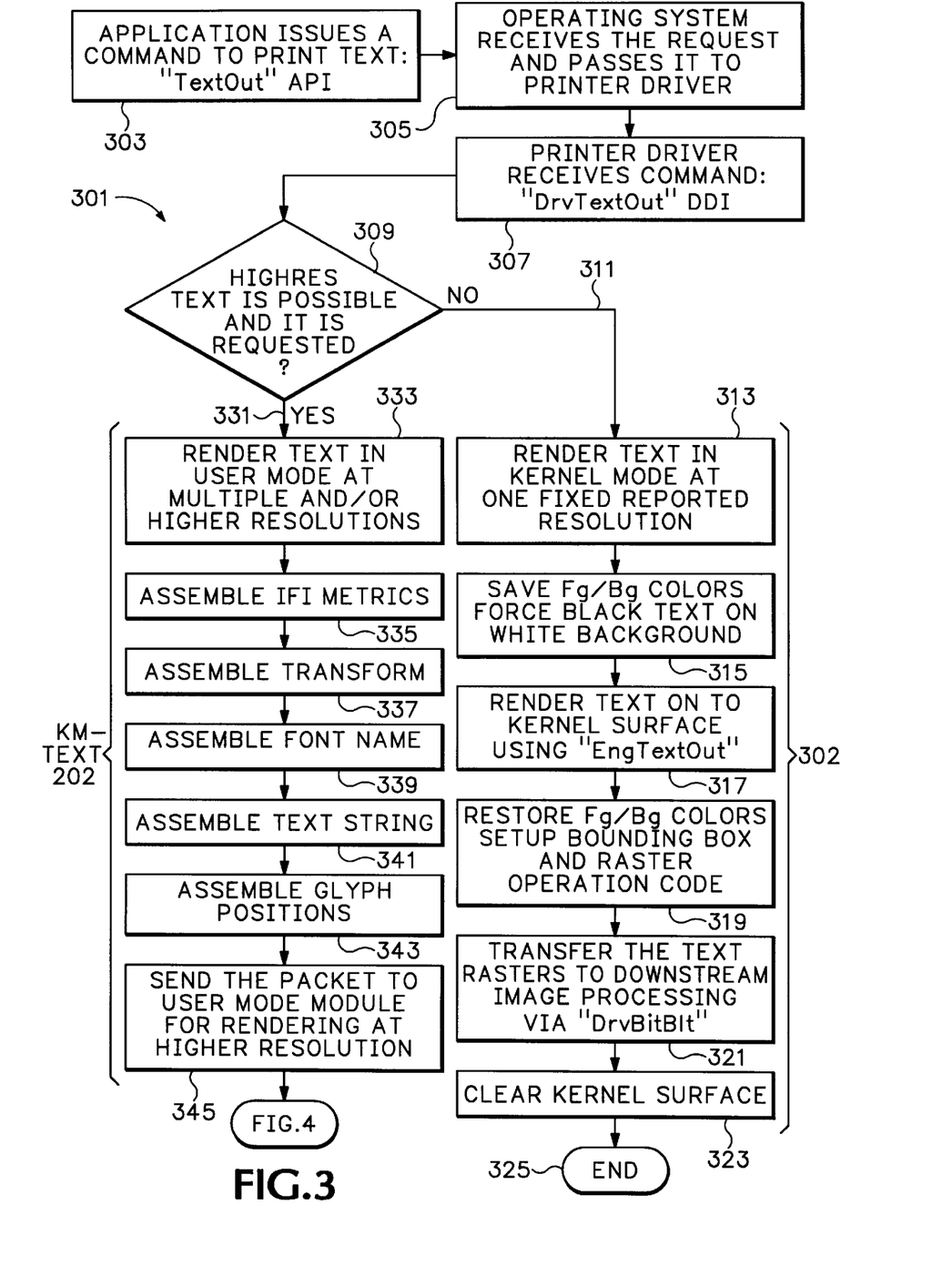
FIG. 3 is a flow chart of text rendering processes showing a conventional O/S text rendering branch and a text rendering branch in accordance with the present invention.

A separation subroutine 301 of application text rendering into conventional printing at reported resolution and the high resolution text rendering subroutines of the present invention is shown in FIG. 3. Generally speaking, most normal hard copy device drivers 105 (FIG. 1) will include the process steps of the NO-path branch 311/302 of the separation subroutine 301.

When a software application program issues a command to print text, "TextOut" API, step 303, the O/S receiving the request passes it to the printer driver 105 uses standard kernel mode DDI commands, "DrvTextOut" DDI, steps 305 and 307, indicating that the DDI is about to draw text.

In a system according to the present invention, the KM_DRIVER 205 includes an option, step 309. This option 309 provides the capability of a high resolution text, "High-Res Text," rendering mode, namely UM_TEXT subroutine 211, in accordance with the hard copy apparatus capability rather than in reliance on the DDI reported resolution. Pre-conditions for whether the HighRes Text rendering mode is possible for a given set of text data is dependent on a variety of factors. For example, the test as to whether HighRes Text rendering mode is possible includes a universal determination as to whether the specified font is recreatable; it is known that PostScript™ fontware is not recreatable because it is an embedded font. Other specific preconditions can be tailored to a specific implementation depending on the type of operating system and the type of hard copy apparatus employed.

Following a conventional printing kernel mode text rendering subroutine 302 process, NO-path 311, when not using HighRes Text mode, the kernel mode text rendering subroutine 302 implements the reported resolution format, step 313; for example, using the Windows O/S 300 dpi×300 dpi standard. Foreground and background color information, "Fg/Bg," is saved and black forced on white, step 315. [Forcing black on white is a well-known technique in the art initially separating text and graphics for later recombination.] Text is rendered onto a kernel surface (which is a well-known technique in the art for virtual printing set up that passes a particular print command back to the O/S for default processing), using the O/S provider commands; e.g., the Windows NT "EngTextOut" routine, step 317. Fg/Bg information is restored using a bounding box and raster operation code setup, step 319 (where the "bounding box" is the smallest rectangle in picture elements, or "pixels," in which an alphanumeric character fits; x-pixels by y-pixels; and where "rasters" are the predetermined computer graphics coding technique which codes each pixel in digital form). The raster data for the text is forwarded to the driver software 105 (e.g., continuing a Windows O/S conversion scheme by using known "DrvBitBlt" DDI commands), step 321, for conversion into driver software 105 PRINT/NO_PRINT commands. In ink-jet printing, this further includes color processing to enhance image appearance by matching dye characteristics of the ink and pen. The kernel surface is cleared, step 323, and the subroutine 302 ends, step 325.

For providing the enhanced resolution mode of text printing, data processing in accordance with the present invention is directed by selecting the HighRes Text, step 309, option YES-path 331. This can be implemented as an automatic selection based on the hard copy device acknowledging a higher printing resolution capability or as an end-user input (such as by providing a "draft mode" vs. "quality mode" output option by way of a hardware or software switch). Using the HighRes Text mode for enhanced text rendering initializes the KM_TEXT mode formatting subroutine 202, step 333.

An O/S vendor provides general definitions of fonts as internal font information, "IFI"; the metrics for IFI are assembled, step 335. ["Assembled" is used herein to mean the well-known programming technique of formatting data into a specific packet structure having logical and physical defined characteristics then recognized by the system or program. Similarly, assembly of the data transform mechanism, step 337, (where "data transform mechanisms" are algorithms well-know in the art for mathematically scaling, rotating, shearing, reflecting, or mirroring drawing objects), font identification code, step 339, actual text data string, step 341 (e.g., again, if in a Windows O/S, known as a WinCharSet), and glyph codes, step 343, (where glyph codes are the driver supplier's proprietary pictorial data representations for alphanumeric characters; e.g., printing codes for actuating specific ink-jet pen nozzles with digital PRINT/NO-PRINT pulses for a given character; note also, a bounding box, supra, encloses a glyph). Assembling IFI metrics, font names, text and string positions are industry standard techniques; the assembling transform in accordance with the present invention is disclosed with respect to FIG. 5 hereinafter.

The assembled text-data packet is then forwarded for text rendering at a higher resolution than the reported resolution, step 345.

Note carefully, that this limited KM_TEXT subroutine 331/202 and conventional printing kernel mode subroutine 311/302 process replaces a full device driver program 105, FIG. 1. That is, in the device driver of the O/S in accordance with the present invention, only those universal commands used in all printing functions of the hard copy apparatus 107 remain integrated with the O/S. Other functionality is moved to a user mode device driver made part of the hard copy apparatus, UM_TEXT 211. A problem inherent is that the API/DDI font information resides in the application and O/S, respectively. Therefore, a transformation working with substantially all reported fonts is required.

Figure 4:
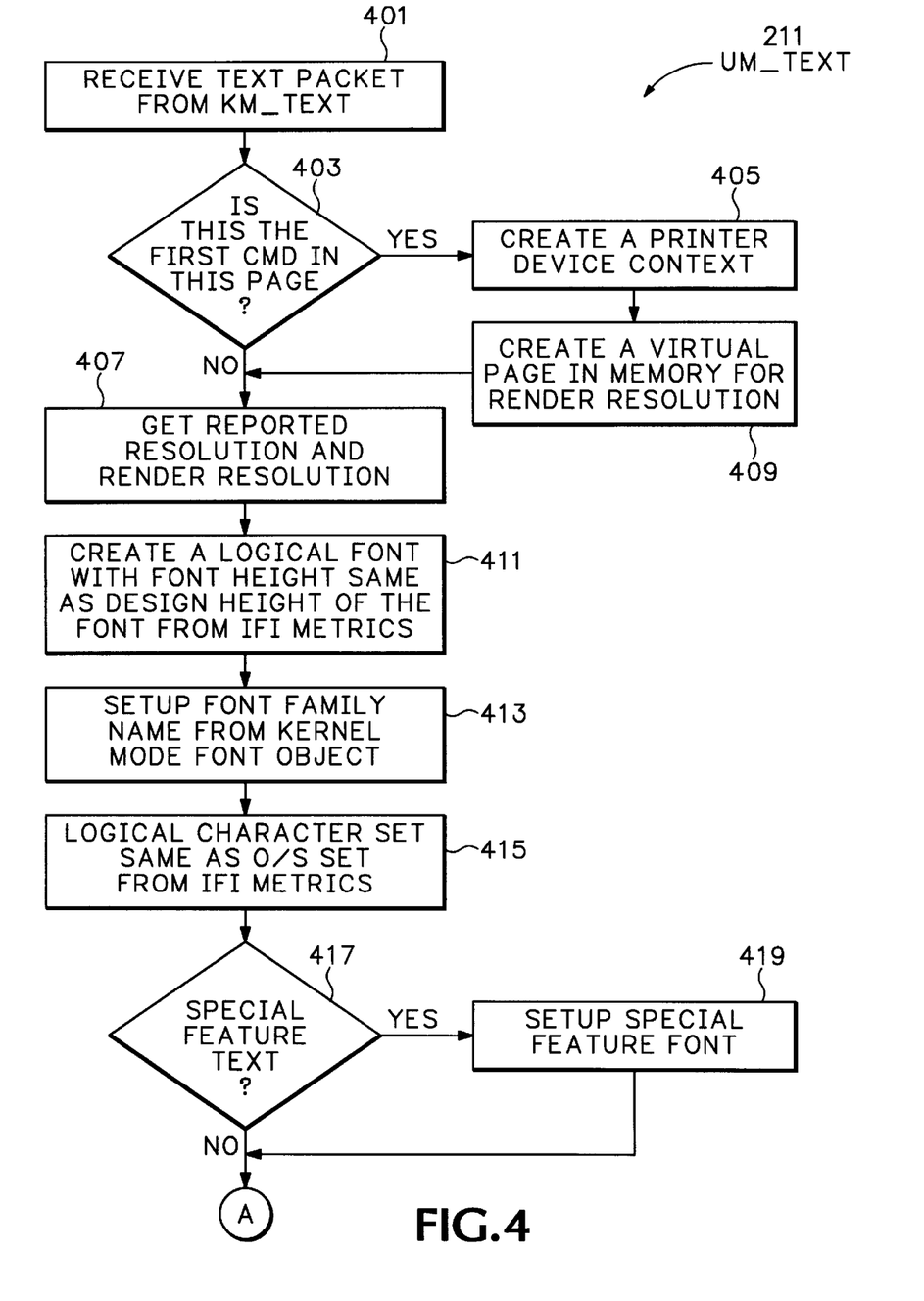
FIG. 4 is a font simulation sub-process flow chart of the process as shown in FIG. 3.

FIG. 4 details the resolution enhancement transformation subroutines of the UM_TEXT subroutine 211 that resolves these inherent problems. The assembled text-data packet is received, step 401. A test is performed to determine if the text-data packet is a new page text command, step 403. If so (YES-path), a virtual context is set up for printing in which the actual printer hardware and firmware parameters that define that printer's characteristics (maximum resolution ink-jet nozzle configurations, e.g., 720 dpi×1200 dpi, or the like as would be known in the art), step 405. A comparison of the reported resolution and the to be rendered resolution is performed, step 407, and noted for use in transformation sub-process. Next, a virtual page is created in memory for the to be rendered resolution, step 409. After the first page, the process skips these steps (step 403, NO-path).

A logical font is created having a font height the same as the design height of the reported object font from the O/S providers internal font information, IFI metrics, step 411, available from step 335. A font family name is set up based on the KM_TEXT mode 202 object font, step 413, available from step 339. A text-data logical character set is conformed to the O/S IFI metrics for the actual text, step 415. A check is made for font features, such as italics, underscoring, underling, boldface, and the like as would be known in the art, step 417. If a special feature is denoted in the IFI metrics, that feature is implemented, step 419.

The background is forced to a transparent mode, step 421, as this mode preserves any graphics that might have been drawn, immediately below the text, by an earlier command.

Then, the logical font 411 is conformed, step 423, to the features in accordance with the initial font set up of steps 413–419.

In order to produce a hard copy, a transformation from logical co-ordinates in the virtual page 409 to actual physical coordinates is required (e.g., from the video display to a virtual page to on-paper pixel locations to be printed by ink-jet nozzles in accordance with techniques as would be known in the art); this is referred to as a "world-transform," step 425.

The reported resolution and HighRes Text render resolution are compared, step 427. When HighRes Text enhancement is to be performed (YES-path) [that is, the actual hard copy apparatus has the capability of printing in a text render resolution higher than the reported resolution and a quality hard copy output has been selected; note that this process is thus conformed to changes in O/S reporting structures, e.g., a new O/S version reporting structure higher than a previous version], the process requires an "Identity Transform" to be established, step 429. Fundamentally, a transform is a operation that converts objects in one reference space. [The fundamentals of three-dimensional constructs and transformations are discussed in the literature, such as *Principles of Color Technology*, by Billmeyer and Saltzman, published by John Wiley & Sons, Inc., New York, copyright 1981 (2d. ed.) and *Color Science: Concepts and Methods, Quantitative Data and Formulae*, by Wyszecki and Stiles, published John Wiley & Sons, Inc., copyright 1982 (2d ed.), incorporated herein by reference in pertinent parts, particularly pages 119–130.] In general, an Identity Transformation process actual semantics depends on the domain of the discourse regarding the constructs involved in the conversion. In the present invention, that conversion relates to a font in which the letter "M" ("eM") is as high as the imaginary grid used by the font designer, with no rotational or translational effects imposed on the font.

Figure 5:
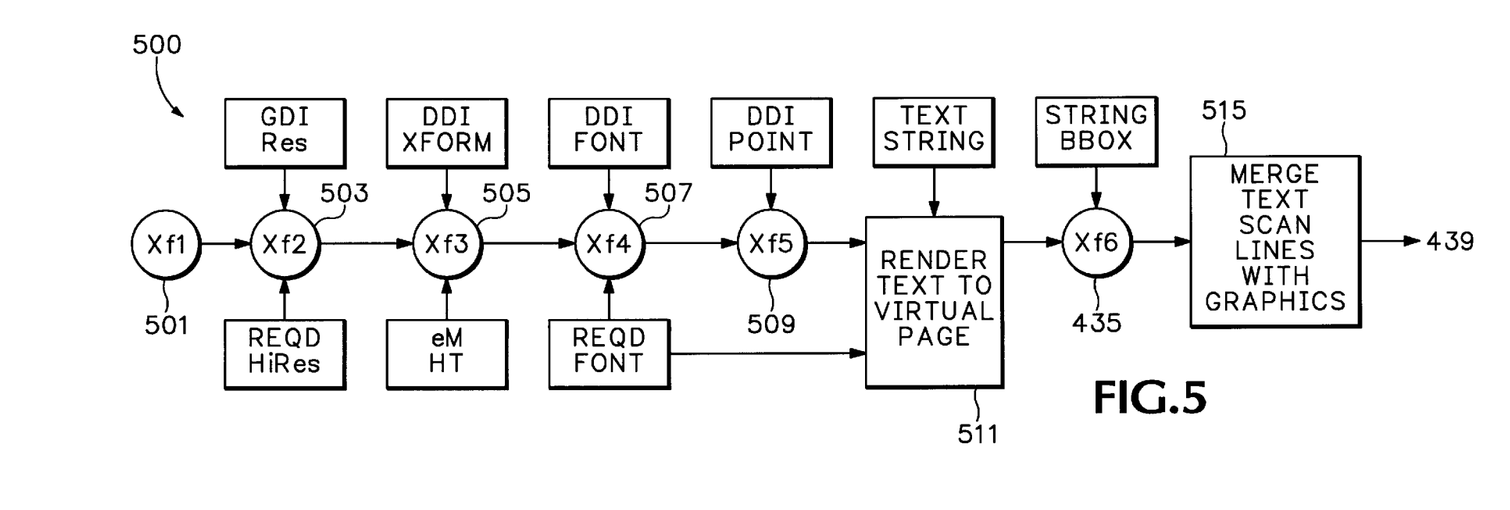
FIG. 5 is a transformation simulation sub-process flow chart of the process as shown in FIG. 3.

The details of an Identity Transform 429 used in accordance with the present invention is shown in FIG. 5. As will be recognized by those skilled in the art, this is only one of the variety of transform algorithms which can be employed in conjunction with the present invention. Briefly then, starting with a one-to-one identity transform at Xf1, stage 501, the GDI resolution and the HiRes Text rendering resolution are merged (by matrix manipulation as would be known in the art) at Xf2, stage 503. An "eM-Height" from DDI information is used to convert at Xf3 to the logical font 423 (FIG. 4) (font designers use the height of the letter "M" as a unit of specifying the height of any character), stage 505. The DDI font data is then converted at Xf4 to the render resolution logical font, stage 507. At this juncture, all characters in a font are available for placement in the exact shape, size, and orientation as they should appear on the paper at the desired higher resolution or non-square resolution. The characters positions are then converted Xf5 from the DDI information to a position on the virtual page 409, including spacing, compression or expansion, and the like as would be known in the art, stage 509. The text string itself is then rendered to the virtual page 409, stage 511. The DDI text string bounding box is converted Xf6 to a region in the virtual page 409, stage 513 (actual bounding boxes of individual characters may overlap and the bounding box of a string is not necessarily the sum of the bounding boxes of the string characters).

The text scan lines are combined with any graphics, if necessary, by blending or overlaying text and graphics in the region defined by a bounding box and clipping box, stage 515.

Mathematically the transform, "Xform" is represented as a 3X3 matrix:

| eM11 | eM12 | 0 |
|------|------|---|
| eM21 | eM22 | 0 |
| eDx  | eDy  | 1 | and, $$Xdevice = Xworld*eM11 + Yworld*eM21 + eDx$$

$$Ydevice = Yworld*eM12 + Yworld*eM22 + eDy,$$

where:

|Xdevice, Ydevice| is a point on the paper, while |Xworld, Yworld| is a point in any one of the intermediate co-ordinate worlds {Xf1, Xf2, et seq.} of FIG. 5.
For example, if $$eM11 = eM22 = eM12 = eM21 = 1, \text{ and}$$

$$eDx = eDy = 0,$$

then the object remains unchanged.
But if, $$eM11 = eM22 = 2,$$

then the object gets magnified by a factor of 2 equally in both the x-axis and the y-axis (where in ink-jet technology, the x-axis is generally the print head scan axis and the y-axis is the paper transport axis). Or, if $$eDx = eDy = 10,$$

than the object shifts to the right and down equally by 10 units. Similarly, eM12 and eM21 are the complex variables for rotation and shearing of objects. [For general background refer to *Computer Graphics, Principles & Practice*, $2^{nd}$ Ed., Foley, van Dam, Feiner and Hughes. Addison-Wesley Publishing Company. Copr. 1996; ISBN: 0-201-84840-6.]

Returning now to FIG. 4, based on the resolution to be used in rendering the text, the bounding box for the raster code is adjusted to fit any changes, step 435. Similarly, the clipping region (where the "clipping region" is an area of the physical page were no printing is allowed, e.g., a margin, a preprinted letterhead area, and the like) is adjusted for the new text rendering resolution, step 437. Next, since the routine is for text printing rather than color graphics, a black on white print mode is selected, step 439. However, as the text may be intended to be in color, e.g., red lettering on a yellow background, a logical brush related to the source text and background coloring is created, step 441.

For the current text string in memory, a decrementing count is set, step 443. As long as the current text string is being processed, step 445, the current glyph is position is determined in device units (where "device units" means the actual unit of movement of the print head or the paper; also referred to as picture element, "pixel," units), step 447. When the reported resolution is different from the render resolution, step 449, YES-path, current glyph position is scaled to the render resolution, step 451. Either the scaled glyph position 451 or the DDI glyph position when the reported resolution is not different from the render resolution, step 449, NO-path, of the current glyph is mapped to logical position on the virtual page, step 453, and rendering the current glyph to the virtual page using the TextOut API 303, FIG. 3) is performed, step 455.

Once the current text string is completely positioned, step 445, NO-path, the current text string bounding box is computed, step 457. Rasters not completed are removed from the available virtual page, step 459, and forwarded for any further image processing/RET program, step 461. If the last text string has been processed, step 463, YES-path, the process is finished 467. Otherwise, the virtual page is cleared, step 469 and the process returns, step 471 to step 401.

Thus, the described process provides high resolution hard copy output from a lower resolution data stream.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents.

What is claimed is:

1. A text data resolution enhancement computer process for recreatable font data having a reported resolution, comprising the steps of:

providing a hard copy device driver program including separate kernel mode device driver process steps and user mode device driver process steps, said kernel mode device driver process steps including process steps for outputting font data at the reported resolution and said user mode device driver process steps including process steps for enhancing said recreatable font data to a resolution higher than said reported resolution, said kernel mode device driver program separately reporting graphics data and text data to said user mode device driver program, and said user mode device driver program recombining graphics data objects and text data objects using said set of text data using a generated simulated font structure by reverse mapping DDI parameters into a form for resolution enhancement.

2. The process as set forth in claim 1 comprising the further steps of:

the kernel mode device driver program supplies limited functionality for basic DDI reported resolution data processing compatible with O/S kernel mode components such that said user mode device driver program is modifiable for text data enhancement independently of said kernel mode device driver program.

3. The process as set forth in claim 1 said user mode device driver program comprising the further step of:

providing an end-user option for selecting or deselecting the process steps for enhancing said recreatable font data to a resolution higher than said reported resolution.

4. A computerized method for text data and graphics data printing from operating system (O/S) standard DDI data having a reported resolution, the method comprising the steps of:

providing a device driver program having a kernel mode device driver module and a seperate user mode device driver module;

said kernel mode device driver module including the steps of receiving a set of text data in said reported resolution with accompanying DDI text print requests, when a font is not recreatable,
rendering text data at the reported resolution and
outputting the set of text data at the reported resolution, when a font is recreatable,
determining if printing is capable at a rendering resolution greater than the reported resolution,
when printing is capable at a rendering resolution greater than the reported resolution,
transferring the set of text data and accompanying DDI text print requests to said user mode device driver module, and
rendering the set of text data at said rendering resolution in the user mode device driver module by establishing a memory construct, simulating rendering resolution font in by reverse mapping the DDI parameters into d form for resolution enhancement, using the simulated rendering resolution font, applying a transformation to the set of text data from reported resolution, transforming to the rendering resolution, and sending the rendering resolution transformed text to the memory construct; and outputting the set of text data at said rendering resolution.

5. The method as set forth in claim 4, said step of applying a transformation comprising the steps of:

creating an identity transformation;

computing rendering resolution for horizontal print axis and vertical print axis factors;

mapping logical co-ordinates of said memory construct to physical output co-ordinates for printing;

adjusting DDI bounding box factors for the rendering resolution;

adjusting DDI clipping box factors for the rendering resolution;

for each character of said the set of text data, rendering a current data text character to said memory construct in the rendering resolution.

6. The method as set forth in claim 4, said step of applying a transformation comprising the steps of:

applying a transform matrix of

| eM11 | eM12 | 0 |
|------|------|---|
| eM21 | eM22 | 0 |
| eDx  | eDy  | 1 | and the formulae

Xdevice=Xworld*eM11+Yworld*eM21+eDx

Ydevice=Yworld*eM12+Yworld*eM22+eDy, where:

|Xdevice, Ydevice| is a co-ordinate point on a physical output, while |Xworld, Yworld| is a point in any one intermediate co-ordinate memory construct.

7. The method as set forth in claim 4, said kernel mode device driver module including the further step of:

separating graphics data and text data.

8. The method as set forth in claim 7, said user mode device driver module further comprising the steps of:

receiving DDI coded instructions for graphics objects data in a graphics color printing system module; and rendered graphics data with said graphics color printing system module at the reported fixed resolution per O/S DDI coded instructions.

9. The method as set forth in claim 8, said user mode device driver module further comprising the step of:

recombining said graphics data with the set of text data at said rendering resolution prior to said step of outputting the set of text data at said rendering resolution.

10. The method as set forth in claim 7, said kernel mode device driver module step of separating graphics data and text data including the further steps of:

assembling IFI metrics;

assembling data transform rendering resolution metrics;

assembling a font name;

assembling a text string;

assembling text glyph positions;

sending the assembled IFI metric, data transform rendering resolution metrics, font name, text string, and text glyph positions to said user mode device driver module.

11. The method as set forth in claim 4 wherein said step of rendering the set of text data at said rendering resolution further comprises the step of:

creating a non-square rendering resolution for the set of text data.

* * * * *

UNITED STATES PATENT AND TRADEMARK OFFICE
CERTIFICATE OF CORRECTION

PATENT NO. : 6,134,567 Page 1 of 1
DATED : October 17, 2000
INVENTOR(S) : Nakkiran et al.

It is certified that error appears in the above-identified patent and that said Letters Patent is hereby corrected as shown below:

Column 2,
Line 46, before "buffer" delete "output" (second occurrence).

Column 11,
Line 37, delete "d" and insert therefor -- a --.

Signed and Sealed this

Sixteenth Day of October, 2001

Attest:

*Nicholas P. Godici*

NICHOLAS P. GODICI
*Attesting Officer*   *Acting Director of the United States Patent and Trademark Office*